United States Patent Office

3,479,373
Patented Nov. 18, 1969

3,479,373
QUINONE BIS(DIHALOMETHYLENES)
Angelo John Speziale and Kenneth Wayne Ratts, Creve Coeur, Mo., assignors to Monsanto Chemical Company, St. Louis, Mo., a corporation of Delaware
No Drawing. Filed Feb. 20, 1963, Ser. No. 260,030
Int. Cl. C07c *49/62, 49/64, 49/68*
U.S. Cl. 260—384          8 Claims This invention relates to new and useful quinone bis(dihalomethylenes) and to their method of manufacture.

The quinone bis(dihalomethylenes) of this invention include the various:

1,2-bis(dihalomethylene) benzoquinones,
1,4-bis(dihalomethylene) benzoquinones,
1,2-bis(dihalomethylene) naphthoquinones,
1,4-bis(dihalomethylene) naphthoquinones,
9,10-bis(dihalomethylene) anthraquinones,
9,10-bis(dihalomethylene) phenanthraquinones, and their ring substituted halogen analogues. These materials structurewise are either

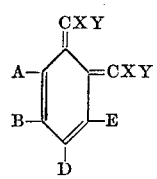

or

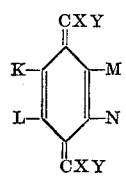

wherein X is halogen of atomic weight in the range of 18 to 80 (i.e. chlorine, bromine or fluorine, preferably chlorine), wherein Y is halogen of atomic weight in the range of 35 to 80 (i.e. chlorine or bromine, preferably chlorine), wherein A, B, D, E, K, L, M and N respectively are either hydrogen or halogen of atomic weight in the range of 35 to 80 (i.e. chlorine or bromine, preferably chlorine), and wherein each of (a) A and B together, (b) D and E together, (c) K and L together, and (d) M and N together, respectively form a carbocyclic radical, specifically the benzo radical $C_6H_4=$ or said benzo radical having from 1 to 4 halogen substituents wherein halogen is of atomic weight in the range of 35 to 80 (i.e. chlorine or bromine, preferably chlorine).

As specific illustrations of the quinone bis(dihalomethylenes) of this invention are the following:

1,2-bis(dichloromethylene) benzoquinone
1,4-bis(dichloromethylene) benzoquinone
1,2-bis(dichloromethylene) naphthoquinone
1,4-bis(dichloromethylene) naphthoquinone
9,10-bis(dichloromethylene) anthraquinone
9,10-bis(dichloromethylene) phenanthraquinone
1,4-bis(dibromomethylene) benzoquinone
1,4-bis(dibromomethylene) naphthoquinone
1,2-bis(dichloromethylene-3-chlorobenzoquinone
1,4-bis(dichloromethylene)-3-chlorobenzoquinone
1,2-bis(dichloromethylene)-4-chlorobenzoquinone
1,4-bis(dichloromethylene)-2-chlorobenzoquinone
1,4-bis(dichloromethylene)-2,5-dichlorobenzoquinone
1,4-bis(dichloromethylene)-2,6-dichlorobenzoquinone
1,4-bis(dichloromethylene)-trichlorobenzoquinone
1,4-bis(dichloromethylene)-tetrachlorobenzoquinone
1,4-bis(dibromomethylene)-tetrachlorobenzoquinone
1,4-bis(dibromomethylene)-tribromobenzoquinone
1,4-bis(dibromomethylene)-tetrabromobenzoquinone
1,2-bis(dichloromethylene)-3-chloronaphthoquinone
1,2-bis(dichloromethylene)-3,4-dichloronaphthoquinone
1,4-bis(dichloromethylene)-2-chloronaphthoquinone
1,4-bis(dichloromethylene)-2,3-dichloronaphthoquinone
1,4-bis(dichloromethylene)-2-bromonaphthoquinone
1,4-bis(dibromomethylene)-2-bromonaphthoquinone
9,10-bis(dichloromethylene)-1-chloroanthraquinone
9,10-bis(dichloromethylene)-2-chloroanthraquinone
9,10-bis(dichloromethylene)-1,3-dichloroanthraquinone
9,10-bis(dichloromethylene)-hexachloroanthraquinone
9,10-bis(dichloromethylene)-octachloroanthraquinone
9,10-bis(dichloromethylene)-2-chlorophenanthraquinone
9,10-bis(dichloromethylene)-3-chlorophenanthraquinone
9,10-bis(dichloromethylene)-4-chlorophenanthraquinone
9,10-bis(dichloromethylene)-2,7-dichlorophen-
  anthraquinone
1,2-bis(bromochloromethylene) benzoquinone
1,4-bis(bromochloromethylene) benzoquinone
1,4-bis(bromochloromethylene) naphthoquinone
9,10-bis(bromochloromethylene) anthraquinone
1,2-bis(fluorochloromethylene) benzoquinone
1,4-bis(fluorochloromethylene) benzoquinone
1,2-bis(fluorochloromethylene) naphthaquinone
9,10-bis(fluorochloromethylene) anthraquinone The quinone bis(dihalomethylenes) of this invention are prepared by reacting a quinone of the formula

or

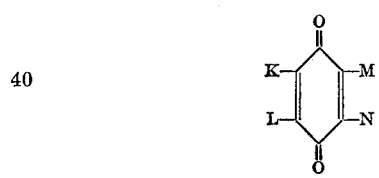

wherein A, B, D, E, K, L, M and N have the aforedescribed significance with a triphenylphosphinedihalomethylene of the formula $(C_6H_5)_3P=CXY$ wherein X and Y have the aforedescribed significance in a molar proportion of about 1:2 in an anhydrous organic liquid medium and at a reaction temperature of about $-5°$ C. to about 20° C.

These triphenylphosphinedihalomethylene precursors adding a haloform of the formula $HCXY_2$ wherein X and Y have the aforedescribed significance (e.g. chloroform, bromoform, bromodichloromethane, fluorodichloromethane, etc.) to a suspension of triphenylphosphine in an inert anhydrous organic liquid hydrocarbon medium at a temperature of about 0 to 10° C. It is preferred not to separate the resulting triphenylphosphinedihalomethylene (a yellow solid in all instances) because of its reactivity with water but to add the appropriate quinone to the resulting mass or concentrate thereof and thereafter recover the resulting quinone bis(dihalomethylene).

As illustrative of the preparation of the quinone bis-(dihalomethylenes) of this invention is the following:

EXAMPLE I 12 parts by weight of chloroform in about 140 parts by weight of heptane is added over a 30 minute period to a well-agitated, ice-cooled mixture of 11.2 parts by weight of anhydrous potassium t-butoxide and 26.2 parts by weight of triphenylphosphine in about 210 parts by weight of heptane. The resulting yellow suspension of triphenylphosphinedichloromethylene, i.e.,

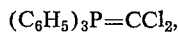

is then concentrated to about 100 parts by volume by vacuum distilling at about 15–20° C. at 30–40 mm. To this concentrate is added 10.4 parts by weight of 9,10-anthraquinone and the reaction mixture agitated for about eleven hours at room temperature. The mass is then permitted to stand at room temperature for eight hours and then filtered. The filtrate is then evaporated under vacuum. The residue, about 24.7 parts by weight, is then extracted with methanol and the extracts discarded. The residue, about 8 parts by weight, upon recrystallizing yielded 9,10 bis(dichloromethylene) anthraquinone

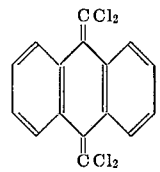

which melts at 196.5–197.0° C.

EXAMPLE II

Employing the procedure of Example I but replacing chloroform with an equimolecular amount of bromoform there is obtained 9,10-bis(dibromomethylene) anthraquinone.

EXAMPLE III

Employing the procedure of Example I but replacing chloroform with an equimolecular amount of fluorodichloromethane there is obtained 9,10-bis(fluorochloromethylene) anthraquinone.

EXAMPLE IV

Employing the procedure of Example I but replacing 9,10-anthraquinone with an equimolecular amount of 1,4-benzoquinone there is obtained 1,4-bis(dichloromethylene)benzoquinone

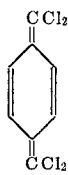

EXAMPLE V

Employing the procedure of Example I but replacing 9,10anthraquinone with an equimolecular amount of tetrachloro-1,4-benzoquinone there is obtained 1,4-bis(dichloromethylene) tetrachlorobenzoquinone.

EXAMPLE VI

Employing the procedure of Example I but replacing 9,10-anthraquinone with an equimolecular amount of 4-bromo-1,2-benzoquinone there is obtained 1,2-bis(dichloromethylene)-4-bromobenzoquinone.

EXAMPLE VII

Employing the procedure of Example I but replacing 9,10-anthraquinone with an equimolecular amount of 2,3-dichloro-1,4-naphthoquinone there is obtained 1,4-bis(dichloromethylene)-2,3-dichloronaphthoquinone

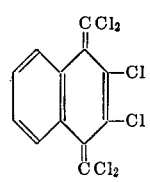

EXAMPLE VIII

Employing the procedure of Example I but replacing 9,10-anthraquinone with an equimolecular amount of octachloro-9,10-anthraquinone there is obtained 9,10-bis(dichloromethylene) octachloroanthraquinone.

EXAMPLE IX

Employing the procedure of Example I but replacing 9,10-anthraquinone with an equimolecular amount of 2-chloro-9,10-phenanthraquinone there is obtained 9,10-bis(dichloromethylene)-2-chlorophenanthraquinone.

The quinone bis (dihalomethylenes) of this invention are useful as fungicides.

While this invention has been described with respect to certain embodiments, it is to be understood that it is not so limited and that variations and modifications thereof obvious to those skilled in the art can be made without departing from the spirit and scope thereof.

What is claimed is:

1. A bis(dihalomethylene) quinone selected from the group consisting of

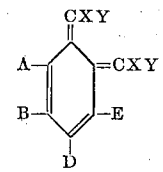

and

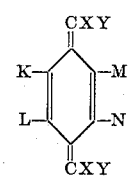

wherein X is halogen of atomic weight in the range of 18 to 80, wherein Y is halogen of atomic weight in the range of 35 to 80, wherein A, B, D, E, K, L, M and N respectively are selected from the group consisting of:
  (1) hydrogen,
  (2) halogen of atomic weight in the range of 35 to 80, and
  (3) wherein each of (a) A and B together, (b) D and E together, (c) K and L together, and (d) M and N together, form a carbocyclic radical selected from the group consisting of the benzo radical $C_6H_4=$ and said benzo radical having from 1 to 4 halogen substituents wherein halogen is of atomic weight in the range of 35 to 80.

2. 1,4-bis(dichloromethylene) benzoquinone.
3. 9,10-bis(dichloromethylene) anthraquinone
4. 1,4 - bis(dichloromethylene) tetrachlorobenzoquinone.
5. 1,4 - bis(dichloromethylene) 2,3-dichloronaphthaquinone.
6. A method which comprises reacting in an anhydrous inert organic liquid at about −5° C. to about 20° C. about two moles of triphenylphosphinedihalomethylene of the formula $(C_6H_5)_3P=CXY$ wherein X is halogen of atomic weight in the range of 18 to 80 and wherein Y is halogen of atomic weight in the range of 35 to 80 with about one mole of a quinone selected from the group consisting of

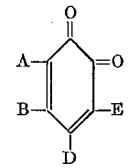

and

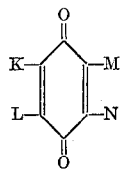

wherein A, B, D, E, K, L, M and N, respectively, are selected from the group consisting of:
(1) hydrogen,
(2) halogen of atomic weight in the range of 35 to 80, and
(3) wherein each of (a) A and B together, (b) D and E together, (c) K and L together, and (d) M and N together, form a carbocyclic radical selected from the group consisting of the benzo radical $C_6H_4=$ and said benzo radical having from 1 to 4 halogen substituents wherein halogen is of atomic weight in the range of 35 to 80, which method provides for a bis (dihalomethylene)quinone selected from the group consisting of

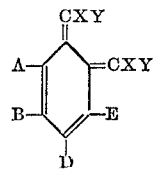

and

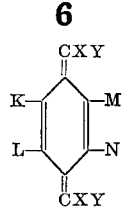

wherein X, Y, A, B, D, E, K, L, M and N, respectively, have the aforedescribed significances.

7. A method in accordance with claim 6 wherein the quinone reactant is 9,10-anthraquinone,

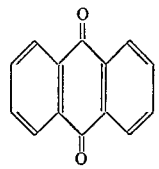

8. A method in accordance with claim 7 wherein the triphenylphosphinedihalomethylene reactant is triphenylphosphinedichloromethylene, $(C_6H_5)_3-P=CCl_2$.

References Cited

Arcoleo, A., et al., Annali di Chimica, Rome: Viale Liegi, 48, volume 47, pp. 415–432 (pages 415–430 relied upon), April 1957 [as reported in Chemical Abstracts, vol. 51, column 15463H (1957)].

Cava, M., et al., Tetrahedron Letters, No. 4, pp. 140–142 (1961).

LORRAINE A. WEINBERGER, Primary Examiner

H. C. WEGNER, Assistant Examiner

U.S. Cl. X.R.

260—396, 999